United States Patent [19]

Yamada et al.

[11] Patent Number: 4,485,371
[45] Date of Patent: Nov. 27, 1984

[54] STEERING WHEEL SYSTEM

[75] Inventors: Takahiro Yamada, Tokyo; Teiji Okuyama, Toyota, both of Japan

[73] Assignee: Aisin Seiki Kabushiki Kaisha, Kariya, Japan

[21] Appl. No.: 368,141

[22] Filed: Apr. 14, 1982

[30] Foreign Application Priority Data

Apr. 14, 1981 [JP] Japan ................................ 56-55808

[51] Int. Cl.³ .................... B60Q 1/42; B62D 3/00
[52] U.S. Cl. ................................ 340/52 R; 340/87;
340/672; 116/31; 180/6.38; 180/6.6; 180/79;
200/61.35; 200/61.54; 74/484 R; 74/496;
74/552
[58] Field of Search ............... 340/52 R, 87, 671, 672,
340/686, 687; 116/31; 180/78, 79, 6.2, 6.24,
6.26, 6.28, 6.38, 6.54, 6.6; 200/61.3, 61.31,
61.32, 61.35, 61.54, 61.56, 61.57; 74/552, 484 R,
491, 496, 497

[56] References Cited

U.S. PATENT DOCUMENTS

| 3,734,051 | 5/1973 | Dahl ..................................... 116/31 |
| 4,013,034 | 3/1977 | Cantley et al. ........................ 116/31 |
| 4,368,454 | 1/1983 | Pilatzki ............................. 74/484 R |

Primary Examiner—Donnie L. Crosland
Attorney, Agent, or Firm—Oblon, Fisher, Spivak, McClelland & Maier

[57] ABSTRACT

A steering wheel mechanism which provides a driver with absolute confirmation of the direction of the orientation of the front wheels by a differential gear reduction mechanism which provides for a reduced amount of rotation of a buffer pad in comparison to the rotation of a steering wheel in which the buffer pad is located. The buffer pad contains display and switching groups which, because of the limited rotation, are easily accessible for purposes for control and ease of reading by the driver.

10 Claims, 3 Drawing Figures

STEERING WHEEL SYSTEM

BACKGROUND OF THE INVENTION

1. Field of the Invention

This invention relates to a steering wheel system and more particularly to a steering wheel for vehicles to change the orientation of the front wheels.

2. Description of the Prior Art

Generally, the direction of steering of the vehicle will depend on the rotation of the steering wheel and therefore the driver may confirm the orientation of the front wheels by means of the position of the spokes of the steering wheel or the position of the buffer pad which rotates with the steering wheel as one body. However, for example, the position of the steering wheel which is rotated by 30 degree from its neutral position would be the same as the position of a steering wheel which is rotated by 390 degree from its neutral position. Thus, the driver cannot confirm with certainty the position of the front wheels when the steering wheel is in a position which is rotated by 30 degree or 390 degree for example.

SUMMARY OF THE INVENTION

Accordingly, one object of the present invention to provide a new and improved steering wheel system where the driver can confirm absolutely the direction or orientation of the front wheels.

It is another object of the present invention to provide a new and improved steering wheel system where the driver can confirm absolutely the direction or position of the front wheels without the need for specific indication or instruction mechanism.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENT

Figure 1:
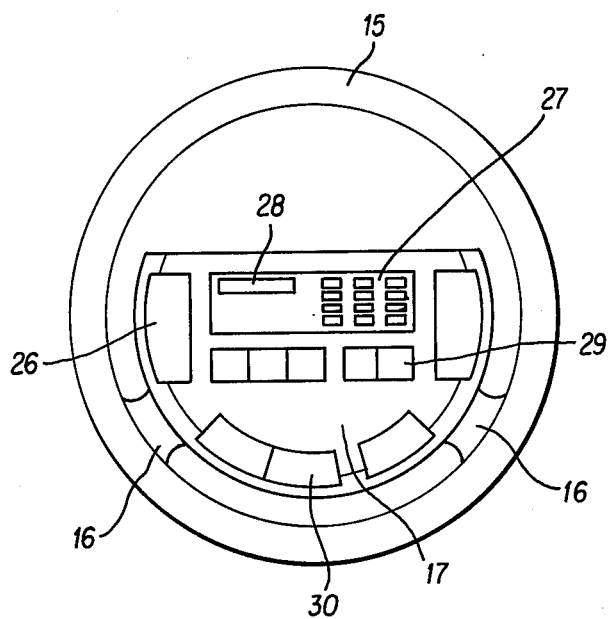
FIG. 1 is a front view of one embodiment of the present invention.
Figure 3:
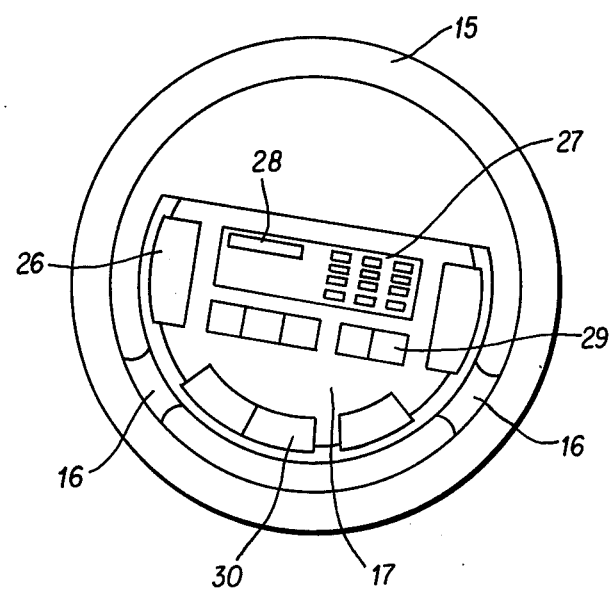
FIG. 3 is a view similar to FIG. 1, but showing an operating condition.
Figure 2:
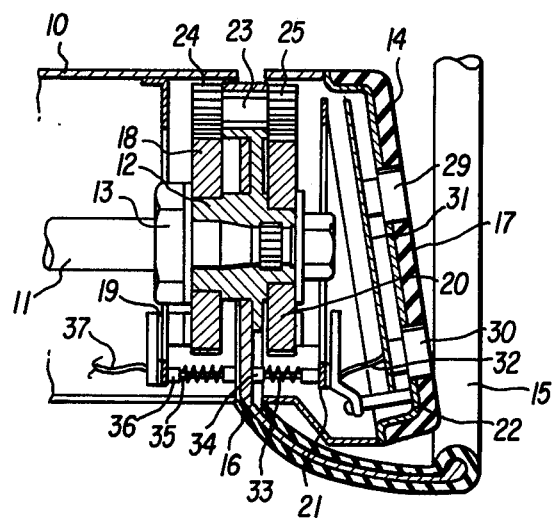
FIG. 2 is a cross-sectional view of FIG. 1.

Referring to FIGS. 1 to 3, illustrating one embodiment of the present invention, a steering shaft 11 passes through an axial tube 10 which is secured to the vehicle body not shown. One end of the steering shaft 11 is secured to a boss 12 by means of nuts 13 and 14. The spokes 16 of a steering wheel 15 are secured to the boss 12 by welding or the like. A buffer pad 17 of elastic material is positioned inside the steering wheel 15. A first exterior gear 18 is relatively rotatably supported on boss 12 and is secured to axial tube 10 through a plate member 19. A second exterior gear 20 is relatively rotatably supported on boss 12 and is secured to pad 17 by means of a plate member 21 and a member 22 which securely receives the pad 17 therein.

A pinion shaft 23, which is rotatably supported on boss 12, has, at one end thereof, a first pinion 24 which is engaged with the first exterior gear 18 and, has, at the other end thereof, a second pinion 25 which is engaged with the second exterior gear 20. Therefore, when steering wheel 15 is rotated, for example, in a clockwise direction, steering shaft 11 may be rotated in the same direction by means of spokes 16 and boss 12 so that the vehicle's wheel, not shown, will be steered in the desired direction. Under these conditions, by rotation of boss 12, first and second pinions 24 and 25 revolve around steering shaft 11 on first and second gears 18 and 20 while turning in a clockwise direction.

The number of gear teeth on first pinion 24 is formed to be the same as that on second pinion 25 and the number of gear teeth of second exterior gear 20 is formed to be at least one more than that of the first exterior gear 18 whereby a differential gear reduction mechanism is formed. Therefore, when steering wheel 15 is rotated in a clockwise direction from its neutral position, as shown in FIG. 1 to its maximum rotated position, as shown in FIG. 3, which is more than one revolution, the buffer pad 17 which is reduced by means of the arrangement of the differential gear reduction mechanism, is rotated less than one revolution. In other words, buffer pad 17 is only rotated in a clockwise direction by an angle such as 20 degrees, as shown in new FIG. 3.

Accordingly, the driver can confirm, with certainty, the direction or orientation of the vehicles front wheels by means of the position of the pad 17. Likewise, when the steering wheel 15 is rotated in a counter-clockwise direction, the counter-clockwise rotation of buffer pad 17 is reduced by means of a differential gear reduction mechanism and the driver can similarly definitely determine the direction or orientation of the front wheels by the position of pad 17.

The buffer pad 17 has thereon a horn switch 26, keys 27, a display 28, which indicates the result of the operation of keys 27, and a first switch group 29 having a switch for the air conditioner and a switch for the radio. There is also included a second switch group 30 for such items as a speed control device. A base plate 31 retains switch groups 29 and 30, with these switch group 29 and 30 being electrically connected to a control circuit, not shown. This connection takes place through a lead wire 32, a spring biased brush 33 which is in electrical connection with one side of the terminal 34 secured to spoke 16, terminal 36, a spring biased brush 35, which is electrically connection with one side of the terminal 36, and lead wire 37. Because the pad 17 may be rotated by a maximum 20 degrees, the driver can always see the switches located thereon without error.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A steering wheel system including a steering wheel which is secured to a steering shaft, steering the wheels of a vehicle, said system comprising:

a buffer pad rotatably supported on one end of said steering shaft, within said steering wheel;

a differential gear reduction mechanism comprising a first exterior gear relatively rotatably supported on said steering shaft and secured to the body of said vehicle, a second exterior gear relatively rotatably supported on said one end of said steering shaft and secured to said buffer pad, a pinion shaft relatively rotatably supported on said steering shaft, a first pinion secured to said pinion shaft and engaged with said first exterior gear, and a second pinion secured to said pinion shaft and engaged with said second exterior gear and wherein said steering wheel is secured to said shaft between said first exterior gear and said second exterior gear, whereby the rotation of said buffer pad is reduced in comparison with the rotation of said steering wheel.

2. The steering system of claim 1 wherein said steering shaft passes through an axial tube which is secured to the body of said vehicle.

3. The steering wheel system of claim 1 wherein said steering shaft is secured to a boss which is in turn secured to the spokes of said steering wheel.

4. Steering wheel system of claim 1 where said buffer pad is made of elastic material.

5. The steering wheel system of claim 3 wherein said pinion shaft is rotatably supported on said steering wheel by means of said boss.

6. The steering wheel system of claim 1 wherein the number of gear teeth of said second exterior gear is formed to be at least one more than the number of teeth of said first exterior gear.

7. The steering wheel mechanism of claim 6 wherein the number of gear teeth on said first pinion is the same as the number of teeth on said second pinion.

8. The steering wheel mechanism of claim 1 wherein said buffer pad has positioned thereon a display and a first and second switch group and wherein a base plate, which is electrically connected to a control circuit, retains said first and second switch groups in conjunction with said buffer pad.

9. The steering wheel mechanism of claim 8 wherein said buffer pad is rotated a maximum of less than 50° so that the driver of said vehicle can always see said switches and said display without error.

10. The steering wheel mechanism of claim 1 wherein the relationship between the position of said buffer pad and the position of said steering wheel provides a definitive indicator of the orientation of the front wheels of said vehicle.

* * * * *